US008543669B2

(12) United States Patent
Chae et al.

(10) Patent No.: US 8,543,669 B2
(45) Date of Patent: Sep. 24, 2013

(54) NETWORK SWITCH AND METHOD OF PREVENTING IP ADDRESS COLLISION

(75) Inventors: Won-Woo Chae, Suwon-si (KR); Gui-Jung Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1385 days.

(21) Appl. No.: 12/058,204

(22) Filed: Mar. 28, 2008

(65) Prior Publication Data

US 2008/0250123 A1 Oct. 9, 2008

(30) Foreign Application Priority Data

Apr. 6, 2007 (KR) ........................ 10-2007-0034177

(51) Int. Cl.
*G06F 15/177* (2006.01)
(52) U.S. Cl.
USPC ........................................................ 709/220
(58) Field of Classification Search
None
See application file for complete search history.

(56) References Cited

U.S. PATENT DOCUMENTS

| 5,724,510 | A  | * | 3/1998  | Arndt et al. ................. 709/220 |
| 6,157,644 | A  | * | 12/2000 | Bernstein et al. ............. 370/392 |
| 6,771,649 | B1 | * | 8/2004  | Tripunitara et al. ....... 370/395.54 |
| 6,829,651 | B1 | * | 12/2004 | Bass et al. .................... 709/238 |
| 6,925,079 | B2 | * | 8/2005  | Matsukawa .................. 370/389 |
| 7,200,649 | B1 |   | 4/2007  | Batke et al. |
| 7,562,390 | B1 | * | 7/2009  | Kwan .............................. 726/23 |
| 2001/0017857 | A1 | * | 8/2001 | Matsukawa .................. 370/392 |
| 2001/0021175 | A1 | * | 9/2001 | Haverinen .................... 370/230 |
| 2002/0016858 | A1 | * | 2/2002 | Sawada et al. ............... 709/238 |
| 2003/0037163 | A1 | * | 2/2003 | Kitada et al. ................. 709/236 |
| 2004/0001492 | A1 | * | 1/2004 | Johnson .................... 370/395.32 |
| 2004/0013099 | A1 | * | 1/2004 | O'Neill ........................ 370/338 |
| 2004/0190477 | A1 | * | 9/2004 | Olson et al. .................. 370/338 |
| 2004/0255033 | A1 | * | 12/2004 | Edney et al. ................. 709/229 |
| 2005/0007962 | A1 | * | 1/2005 | Nam et al. .................... 370/252 |
| 2005/0198242 | A1 | * | 9/2005 | Kim .............................. 709/223 |
| 2006/0209818 | A1 |   | 9/2006  | Purser |
| 2006/0248229 | A1 | * | 11/2006 | Saunderson et al. .......... 709/245 |
| 2008/0195700 | A1 | * | 8/2008 | Jonsson ........................ 709/203 |
| 2008/0222275 | A1 | * | 9/2008 | Yumoto ........................ 709/220 |
| 2009/0307371 | A1 | * | 12/2009 | Okazaki et al. ............... 709/233 |

FOREIGN PATENT DOCUMENTS

KR 10-2004-0003977 A 1/2004
KR 10-0432675 B1 5/2004

OTHER PUBLICATIONS

Perkins, C. "RFC 2002—IP Mobility Support." Retrieved form the Internmet on May 6, 2010. Published Oct. 1996. <URL: http://www.ietf.org/rfc/rfc2002.txt>.*
Stevens, Richard W. "TCP/IP Illustrated vol. 1." Retrieved form the Internet on May 6, 2010. Published Jan. 23, 2002. <URL: http://www.acmesecurity.org/~vinicius/ebooks/tcpipillustrated.pdf>.*
Nikkei PB Soft Press. Partial translation of "Microsoft Windows 2000 Technical Reference TCP/IP Protocol & Service Guide." Retrieved from the Internet on May 6, 2010. Retrieved from Paper File Wrapper for U.S. Appl. No. 11/915,871.*

\* cited by examiner

*Primary Examiner* — Joseph Avellino
*Assistant Examiner* — James Baron
(74) *Attorney, Agent, or Firm* — Jefferson IP Law, LLP (57) ABSTRACT

A network switch and a method of preventing an IP address collision is provided. When a new node tries to use an IP address, which is being used in one broadcast domain, it is possible to detect and prevent an IP address collision in real-time, disconnect only the new node which caused the IP address collision, and quickly resolve network environment to the original state that existed prior to the collision, in order to prevent communication breakdown without the use of an additional device.

22 Claims, 5 Drawing Sheets

NETWORK SWITCH AND METHOD OF PREVENTING IP ADDRESS COLLISION

PRIORITY

This application claims the benefit under 35 U.S.C. §119 (a) of a Korean patent application filed in the Korean Intellectual Property Office on Apr. 6, 2007 and assigned Serial No. 2007-0034177, the entire disclosure of which is hereby incorporated by reference.

BACKGROUND OF THE INVENTION

1. Field of the Invention

The present invention relates to a network switch and a method thereof. More particularly, the present invention relates to a network switch and a method of preventing an IP address collision.

2. Description of the Related Art

In response to the development of telecommunication and Internet technologies, the number of products entering the market, which enable a user to be connected to an IP network using a conventional Personal Computer (PC) based host, are increasing.

The expansion and utilization of various architectures of IP networks are causing an increasing occurrence of IP address collisions in nodes.

Accordingly, there is an increasing importance of promptly identifying and resolving IP address collisions.

An IP address collision occurs when two or more nodes have the same IP address on a subnet in the same broadcast domain environment. In the event of an IP address collision, communication is disabled.

The IP address collision can be resolved by finding a node, which caused the IP address collision, and then carrying out proper procedures, so that a node occupying the collision IP address can maintain its functionality.

According to a conventional method for resolving this type of IP address collision, a user or an operator recognizes the IP address collision of the nodes, assigns new IP addresses to the nodes experiencing the IP address collision, and then attempts reconnection.

However, this method is inconvenient for both the user and the manager. To address the inconvenience of the user or the manager, there is provided a system that uses a separate device, which collects and analyzes all Address Resolution Protocol (ARP) packets, in order to monitor and resolve IP address collisions.

A Dynamic Host Configuration Protocol (DHCP) server is also used to determine whether or not there is a duplicate IP address when it assigns an IP address to a node that is being newly connected.

According to the method described above, in which the user or the operator of the nodes assigns a new IP address for reconnection after the recognition of an IP address collision, it is very difficult, in practice, to recognize a node which uses a duplicate IP address as a result of the implementation of various and complicated network architecture environments. This difficulty causes a delay in network management procedures. Therefore, network service qualities which are desirable to the user, cannot be provided.

According to the approach described above of using a separate device to collect and analyze all ARP packets, a probe is for each broadcast domain. This approach, however, is expensive in some network environments such as a Virtual LAN (VLAN) where many broadcast domains are present.

Furthermore, the ability to use the DHCP server as described above is limited since it is available for only a specific network environment, which uses dynamic IP address assignment based upon DHCP.

SUMMARY OF THE INVENTION

An aspect of the present invention is to address at least the above-mentioned problems and/or disadvantages and to provide at least the advantages described below. Accordingly, an aspect of the present invention is to provide a network switch and a method of preventing an IP address collision, which, when a new node tries to use an IP address which is being used in one broadcast domain, can detect and prevent an IP address collision in real-time, can disconnect only the new node which caused the IP address collision, and can quickly resolve network environments to the original state prior to the collision in order to prevent communication breakdown without the use of an additional device.

According to an aspect of the invention, a network switch is provided. The network switch includes a collision detector for broadcasting a first Address Resolution Protocol (ARP) request message, received by a port of the network switch, to a broadcast domain, and if a first ARP reply message, transmitted to a source Media Access Control (MAC) address of the first ARP request message, is received, for storing the source MAC address in a collision list, and a collision manager, which stores collision MAC addresses, for comparing a destination MAC address of a packet with a MAC address of the network switch if the packet is not the first ARP request message and the source MAC address is included in the collision list, and for at least one of transmitting the first ARP reply message, including the MAC address of the network switch, to an originating node of the packet if the destination MAC address of the packet is not equal with the MAC address of the network switch, and dropping the packet if the destination MAC address of the packet is equal with the MAC address of the network switch.

The collision detector, if the first ARP reply message is not received, determines whether or not the source MAC address, included in the first ARP request message, is present in the collision list, and deletes the source MAC address from the collision list.

The collision manager, if the destination MAC address of the packet is not equal to the MAC address of the network switch, acquires an Internet Protocol (IP) address corresponding to the destination MAC address of the packet, and transmits the first ARP reply message, including the MAC address of the network switch, to an offending node, which has the source MAC address of the packet.

The collision manager acquires the IP address corresponding to the destination MAC address by at least one of using an ARP cache, and transmitting a specified ARP request message and then receiving a specified ARP reply message.

The first node transmits a packet by setting the MAC address of the network switch, included in the ARP reply message, as a receiving MAC address.

The network switch may further include a collision resolver, which broadcasts a second ARP request message, for including a MAC address of a defending node, to the broadcast domain if the first ARP reply message is received in response to the first ARP request message.

The collision resolver drops a second ARP reply message received from the defending node.

The collision resolver generates a Simple Network Management Protocol (SNMP) trap message, including address collision information, and transmits the SNMP trap message to the broadcast domain.

The collision resolver sets a filtering of the port, which received the first ARP request message, in relation to the MAC address, included in the first ARP request message, to prevent the packet from being transmitted, via the port which received the first ARP request message, to other ports.

The network switch may further include a MAC address table for storing the MAC address and port information included in the first ARP request message, an ARP cache for storing MAC addresses and IP addresses; and wherein the collision list stores a MAC address of a first node for which the first ARP reply message in response to the first ARP request message is received.

According to another aspect of the invention, another network switch is provided. The network switch includes a collision detector for broadcasting a first ARP request message, received by a first port of the network switch, to a broadcast domain, and if a first ARP reply message in response to the first ARP request message is received, for storing a source MAC address of the first ARP request message in a collision list, a collision manager for comparing a destination MAC address of a packet, received from a network, with a MAC address of the network switch if a source MAC address of the received packet is a collision MAC address, and for at least one of transmitting the first ARP reply message, including the MAC address of the network switch, to an offending node if the destination MAC address of the received packet is not equal with the MAC address of the network switch, and dropping the received packet if the destination MAC address of the received packet is equal with the MAC address of the network switch; and wherein the collision resolver broadcasts a second ARP request message, including a MAC address of a defending node, to the broadcast domain if the first ARP reply message is received, to resolve the MAC address of the defending node by the neighbor node.

The collision resolver sets a filtering of the first port in relation to the MAC address of the offending node, to prevent a packet, received from the offending node, from being transmitted from the first port to other ports.

According to a further aspect of the invention, a method of preventing an address collision is provided. The method includes receiving a packet from a network, if the packet received from the network is a first ARP request message, transmitting the packet to a broadcast domain, and if a first ARP reply message is received, storing a source MAC address of the packet in a collision list, if the packet received from the network is not the first ARP request message, determining whether the source MAC address of the packet is present in the collision list, if the source MAC address of the packet is present in the collision list, comparing a destination MAC address of the packet with a MAC address of a network switch, if the destination MAC address of the packet is not equal with the MAC address of the network switch, transmitting the first ARP reply message, including the MAC address of the network switch, to an offending node, to set the destination node of the packet as the MAC address of the network switch, and if the destination MAC address of the packet is equal with the MAC address of the network switch, dropping the packet.

The method may further include if the first ARP reply message is not received, determining whether the source MAC address, included in the first ARP request message, is present in the collision list, and if the source MAC address, included in the first ARP request message, is present in the collision list, deleting the source MAC address from the collision list.

The method may include storing the source MAC address, included in the first ARP request message, and receiving port information in a MAC address table by MAC address learning; and if the first ARP reply message is not received, storing the source MAC address in an ARP cache, and if the source MAC address is present in the collision list, deleting the source MAC address from the collision list.

The method may further include if the source MAC address of the packet is not equal with the MAC address of the network switch, acquiring an IP address, corresponding to the destination MAC address of the packet, by using at least one of an ARP cache and a specified ARP reply message, which is received in response to a specified ARP request message transmitted to the network.

The method may further include if the first ARP reply message is received, transmitting the first ARP request message, including a MAC address of a defending node, to the broadcast domain to resolve the MAC address of the defending node by a neighbor node.

The method may further include if the first reply message is received, setting a filtering of a port, which received the packet, in relation to the MAC address of the offending node.

According to a still another aspect of the invention, another method of preventing an address collision is provided. The method includes receiving a packet from a network, if the packet received from a network is a first ARP request message, transmitting the packet to a broadcast domain, determining whether a first ARP reply message is received, and if the first ARP reply message is received, storing a source MAC address of the first ARP request message in a collision list, if the packet received from the network is not the first ARP request message and a source MAC address of the packet is present in the collision list, comparing a destination MAC address of the packet with a MAC address of a network switch, if the destination MAC address of the packet is not equal with the MAC address of the network switch, transmitting the first ARP reply message, including the MAC address of the network switch, to an offending node, which transmitted the packet, and if the destination MAC address of the packet is equal with the MAC address of the network switch, dropping the packet, and if the first ARP reply message is received, broadcasting a second ARP request message, including a MAC address of a defending node, to the broadcast domain, to resolve the MAC address of the defending node by a neighbor node, and setting a filtering of a port, which received the first ARP request message, in relation to a MAC address of the offending node.

The broadcasting of the second ARP request message, including a MAC address of a defending node, to the broadcast domain, includes generating an SNMP trap message, including address collision information, and transmitting the SNMP message to the broadcast domain.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and other advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, a network switch and a method of preventing an address collision according to exemplary embodiments of the present invention will be described with reference to the accompanying drawings.

Figure 1:
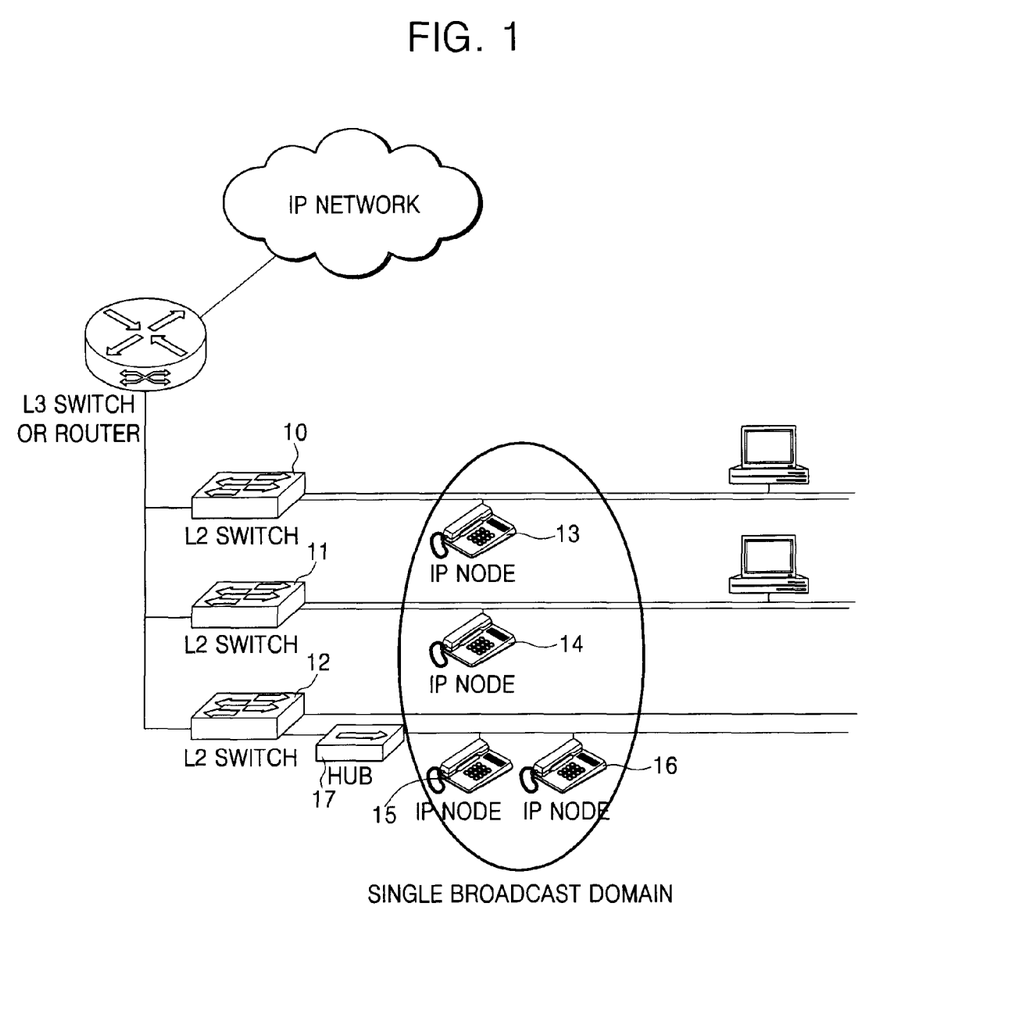
FIG. 1 is a configuration view illustrating an exemplary network link configuration, to which exemplary embodiments of the present invention are applicable.

FIG. 1 is a configuration view illustrating an exemplary network link configuration, to which exemplary embodiments of the present invention are applicable.

As shown in FIG. 1, a plurality of IP nodes 13, 14, 15 and 16 are present in a single broadcast domain, in which the IP node 13 is connected to an L2 switch 10, the IP node 14 is connected to an L2 switch 11, and the IP nodes 15 and 16 are connected to an L2 switch 12 via a hub 17.

While the network switch of the invention will now be described with respect to an L2 switch, the network switch may equally be implemented with any device that switches a packet in a substantially equal broadcast domain environment.

The operation of the L2 switch will be described with respect to the L2 switch 12.

Figure 2:
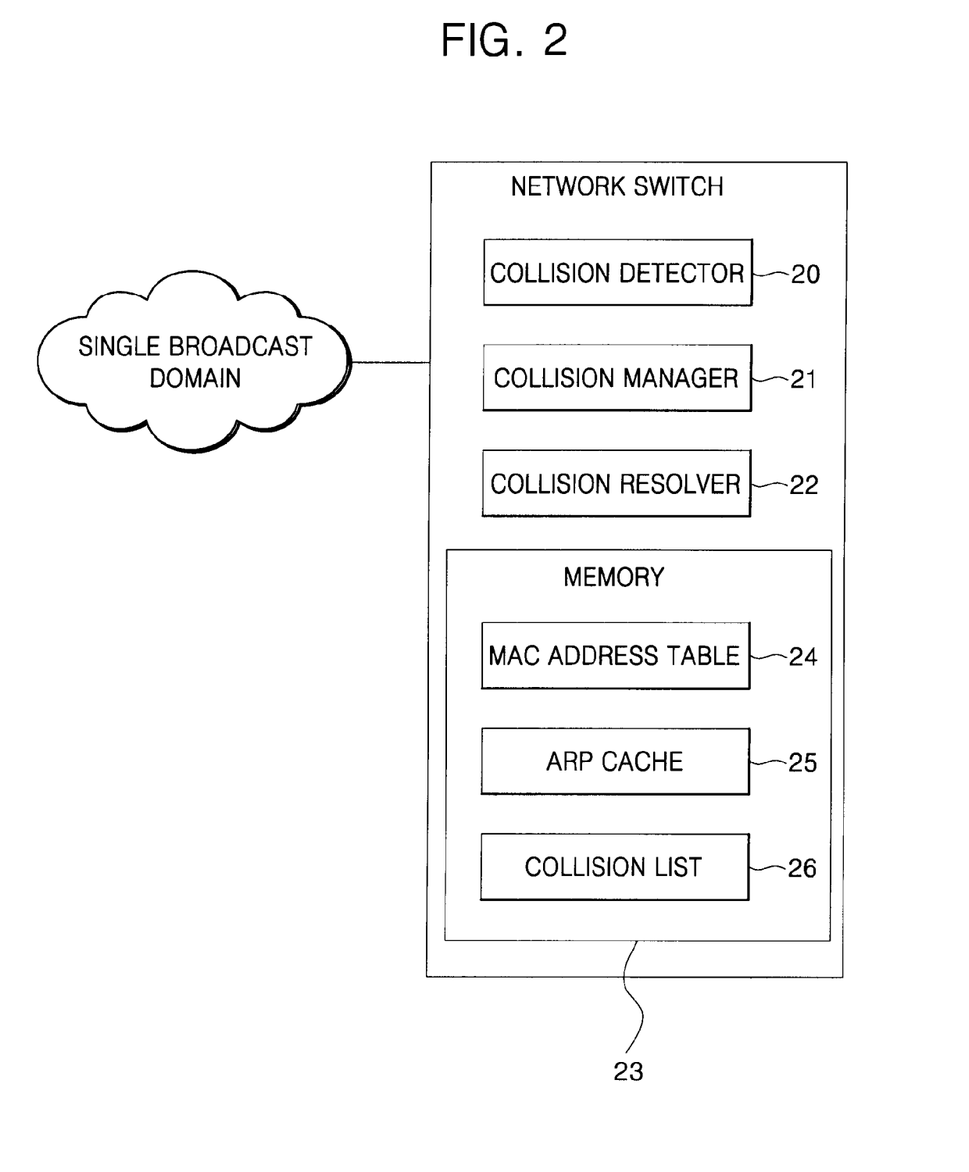
FIG. 2 is a block diagram illustrating the structure of a network switch according to an exemplary embodiment of the invention.

When the packet type of a packet, received by a port of the L2 switch 12, is a Gratuitous ARP request message that is used for the detection of an IP address collision, the L2 switch 12 adds the MAC address and the port information, of the IP node which transmitted the Gratuitous ARP request message, into a MAC address table (see 24 in FIG. 2). Herein, the IP node which transmitted the Gratuitous ARP request message is indicated as the IP node 15.

Then, the L2 switch 12 transmits the Gratuitous ARP request message into a broadcast domain through all ports thereof (packet transmitting/receiving ports), and determines whether or not a Gratuitous ARP reply message, transmitted to the MAC address of the IP node 15 included in the Gratuitous ARP request message, is received by all the ports thereof within a preset time period. Alternatively, the L2 switch may transmit the Gratuitous ARP request message into the broadcast domain through fewer than all ports. Furthermore, the L2 switch may determine whether or not a Gratuitous ARP reply message is received by fewer than all the ports thereof within a preset time period.

If the Gratuitous ARP reply message, transmitted to the MAC address of the IP node 15 included in the Gratuitous ARP request message, is not received by the ports within the preset time period, that is, if there aren't any nodes using the same MAC address as that of the IP node 15, the L2 switch 12 adds or updates the MAC address of the IP node 15, included in the Gratuitous ARP message, to an ARP cache (see 25 of FIG. 2).

Then, the L2 switch 12 determines whether or not the MAC address of the IP node 15, added or updated to an ARP cache table of the ARP cache 25, is included in a collision list (see 26 of FIG. 2) in order to determine whether or not the MAC address of the IP node 15, added or updated to the ARP cache table of the ARP cache 25, is the MAC address of a node which has been under the collision management.

If the MAC address of the IP node 15, added or updated to the ARP cache table, is included in the collision list 26, the L2 switch 12 deletes the MAC address of the IP node 15 from the collision list 26. That is, the L2 switch 12 deletes the MAC address of the IP node 15 from the collision list 26 since there has not been any Gratuitous ARP reply messages received that indicate that another node is currently using the MAC address of the IP node 15.

If the detected packet type is not a Gratuitous ARP request message, the L2 switch 12 determines whether or not the MAC address of the IP node 15, included in the detected packet, is present in the collision list 26. If the source MAC address in the detected packet, that is, the MAC address of the IP node 15, is not included in the collision list 26, the L2 switch 12 switches the packet normally.

If the source MAC address is in the detected packet, that is, the MAC address of the IP node 15 included in the collision list 26, the L2 switch 12 determines whether or not a destination MAC address, included in the received packet, is the same as the MAC address of the L2 switch 12. The L2 switch 12 drops the detected packet if the destination MAC address is the same as its own MAC address. The L2 switch 12 drops the detected packet because the L2 switch 12 is already performing a proxy function when the destination MAC address of the detected packet is its own MAC address.

In this case, the node (particularly, the IP node 15), which transmitted the packet, is attempting to communicate with a node inside the broadcast domain, and thus the L2 switch 12 performs a proxy function for the node inside the broadcast domain if the destination MAC address included in the detected packet is not the same as the MAC address of the L2 switch 12.

That is, the L2 switch 12 acquires the IP address in relation to the destination MAC address included in the detected packet if the destination MAC address included in the detected packet is not the same as the MAC address of the L2 switch 12.

In particular, the L2 switch 12 can acquire the IP address of the destination MAC address, included in the detected packet, using the ARP cache. As an alternative, the L2 switch 12 can acquire the IP address of the destination MAC address by transmitting a specified ARP request message and then receiving an ARP reply message.

After the IP address of the destination MAC address included in the detected packet is acquired, the L2 switch 12 transmits its own MAC address on an ARP reply message to the IP node 15, which has the MAC address included in the detected packet.

Next, in order to update the ARP cache of respective nodes present in the broadcast domain, the L2 switch 12 generates a Gratuitous ARP request message including the MAC address of a defending node (i.e., a node that is using an IP address which another node is trying to use), and then broadcasts the Gratuitous ARP request message into the broadcast domain.

When a Gratuitous ARP reply message, transmitted to the MAC address included in the Gratuitous ARP request message, is received in a preset time period, the L2 switch 12 transmits the collision information of the IP address on a Simple Network Management Protocol (SNMP) trap message to the network, and stores the MAC address of an offending node (i.e., a node that is trying to use an IP address which a defending node is using) in the collision list 26.

The L2 switch 12 broadcasts the MAC address of the defending node on the Gratuitous ARP request message to neighbor nodes in the same broadcast domain since the ARP cache 25 of respective neighbor nodes in the same broadcast domain may be influenced by the offending node. Accordingly, the neighbor nodes, when receiving the Gratuitous ARP request message, can restore the ARP cache 25 with the MAC address of the defending node.

When the Gratuitous ARP reply message is received from the defending node, the L2 switch 12 drops the Gratuitous ARP reply message. That is, the L2 switch 12 disregards the Gratuitous ARP reply message since it already broadcast the Gratuitous ARP request message for the resolution of the address collision.

The L2 switch 12 sets a MAC address filtering of the offending node in relation to the port which received the Gratuitous ARP request message from the IP node 15 (i.e., the offending node).

Accordingly, the L2 switch 12, acting as a network switch, prevents the packet from being transmitted from the port, which received the Gratuitous ARP request message from the offending node, to other ports. Only the MAC address filtering is set since other switches may be connected in cascade to the port, to which the offending node belongs, according to a network construction environment, or a plurality of nodes may be present through a switching hub in the offending node.

FIG. 2 is a block diagram illustrating the structure of a network switch according to an exemplary embodiment of the invention.

As shown in FIG. 2, the network switch of the exemplary embodiment of the invention includes a collision detector 20, a collision manager 21, collision resolver 22 and a memory 23. The memory 23 includes a MAC address table 24, an ARP cache 25 and a collision list 26. Any combination of the MAC address table 24, the ARP cache 25 and the collision list 26 may be stored in one or more memories of any number of types of memory. For example, the collision list 26 may be stored in a nonvolatile memory.

When the packet type of a packet, detected by a port of the network switch, is a Gratuitous ARP request message in use for the detection of IP address collision, the collision detector 20 adds the MAC address and the port information of an IP node, which transmitted the Gratuitous ARP request message, to the MAC address table 24 through a MAC address learning process.

Then, the collision detector 20 transmits the Gratuitous ARP request message into a broadcast domain via all ports of the network switch, and determines whether or not a Gratuitous ARP reply message, transmitted to a MAC address in the Gratuitous ARP request message, is received by all of the ports during a preset time period. Alternatively, the collision detector 20 may transmit the Gratuitous ARP request message into the broadcast domain through fewer than all ports. Furthermore, the collision detector 20 may determine whether or not a Gratuitous ARP reply message is received by fewer than all of the ports thereof within a preset time period.

If the Gratuitous ARP reply message, transmitted to a MAC address in the Gratuitous ARP request message, is not received by the ports within the preset time period, the collision detector 20 adds or updates the MAC address, included in the Gratuitous ARP request message, to the ARP cache 25. If the Gratuitous ARP reply message is received, the collision detector 20 stores the MAC address, which is included in the request ARP reply message, in the collision list 26.

Next, if the Gratuitous ARP request message is not received, the collision detector 20 determines whether or not the MAC address, added or updated to (a cache table of) the ARP cache 25, is included in the collision list in order to determine whether or not the MAC address, added or updated to the table of the ARP cache 25, is the MAC address of a node which has been under collision management.

If the MAC address, added or updated to the table of the ARP cache 25, is included in the collision list 26, the collision detector 20 deletes the MAC address from the collision list 26. Here, the collision detector 20 deletes the MAC address from the collision list 26 because a node which previously caused an IP address collision is assigned with a new IP address, or there are no other nodes having the same active IP address.

In the meantime, if the detected packet type is not a Gratuitous ARP request message, the collision manager 21 determines whether or not the MAC address, included in the detected packet, is included in the collision list 26. If the source MAC address, included in the detected packet, is not included in the collision list 26, the collision manager 21 switches the packet normally.

If the source MAC address, included in the detected packet, is included in the collision list 26, the collision manager 21 determines whether or not a destination MAC address, included in the received packet, is the same as the MAC address of the network switch. If the destination MAC address included in the detected packet is the same as the MAC address of the network switch, the collision manager 21 drops the detected packet.

Here, the collision manager 21 drops the detected packet because the network switch is already performing a proxy function for a counterpart node with which a node having the MAC address included in the collision list 26 (i.e., an offending node) is trying to communicate.

If the destination MAC address, included in the detected packet, is not the same as the MAC address of the network switch, the collision manager 21 determines that the node, which transmitted the detected packet, is trying to communicate with a counterpart node inside the broadcast domain, and then performs a proxy function for the counterpart node.

That is, if the destination MAC address included in the detected packet is not the same as the MAC address of the network switch, the collision manager 21 acquires the IP address in relation to the destination MAC address included in the detected packet.

In particular, the collision manager 21 can acquire the IP address of the destination MAC address, included in the detected packet, using the ARP cache 25. As an alternative, the collision manager 21 can acquire the IP address of the destination MAC address by transmitting a specified ARP request message and then receiving an ARP reply message.

After the IP address of the destination MAC address included in the detected packet is acquired, the collision manager 21 transmits the MAC address of the network switch in an ARP reply message to the IP node 15, which has the MAC address included in the detected packet. Through these procedures, the collision manager 21 performs a proxy function for the counterpart node, with which the node having the source MAC address included in the detected packet (i.e., an offending node) is trying to communicate. That is, the collision manager 21 assigns the MAC address of the network switch for the destination MAC address of the packet, transmitted to the counterpart node of the offending node, so that the network switch can receive and drop the packet.

Next, in order to update the ARP cache of respective nodes present in the broadcast domain, the collision manager 21 generates a Gratuitous ARP request message including the MAC address of a defending node, and then broadcasts the Gratuitous ARP request message into the broadcast domain.

When a Gratuitous ARP reply message, transmitted to the MAC address included in the Gratuitous ARP request message, is received within a preset time period, the collision resolver 22 transmits the collision information of the IP address on an SNMP trap message to the network, and stores the MAC address of the offending node in the collision list 26.

The collision resolver 22 broadcasts the MAC address of the defending node on the Gratuitous ARP request message to neighbor nodes in the same broadcast domain since the ARP cache of respective neighbor nodes in the same broadcast domain may be influenced by the offending node. Accordingly, the neighbor nodes, when receiving the Gratuitous ARP request message, can restore the ARP cache with the MAC address of the defending node.

When the Gratuitous ARP reply message is received from the defending node, the collision resolver 22 drops the Gratuitous ARP reply message.

The collision resolver 22 sets a MAC address filtering of the offending node in relation to the port which received the Gratuitous ARP request message from the offending node.

Accordingly, the network switch prevents the packet from being transmitted from the port, which received the Gratuitous ARP request message from the offending node, to other ports.

Only the MAC address filtering is set since other switches may be connected in cascade to the port, to which the offending node belongs, according to the network construction environment, or a plurality of nodes may be present through a switching hub in the offending node.

Figure 3:
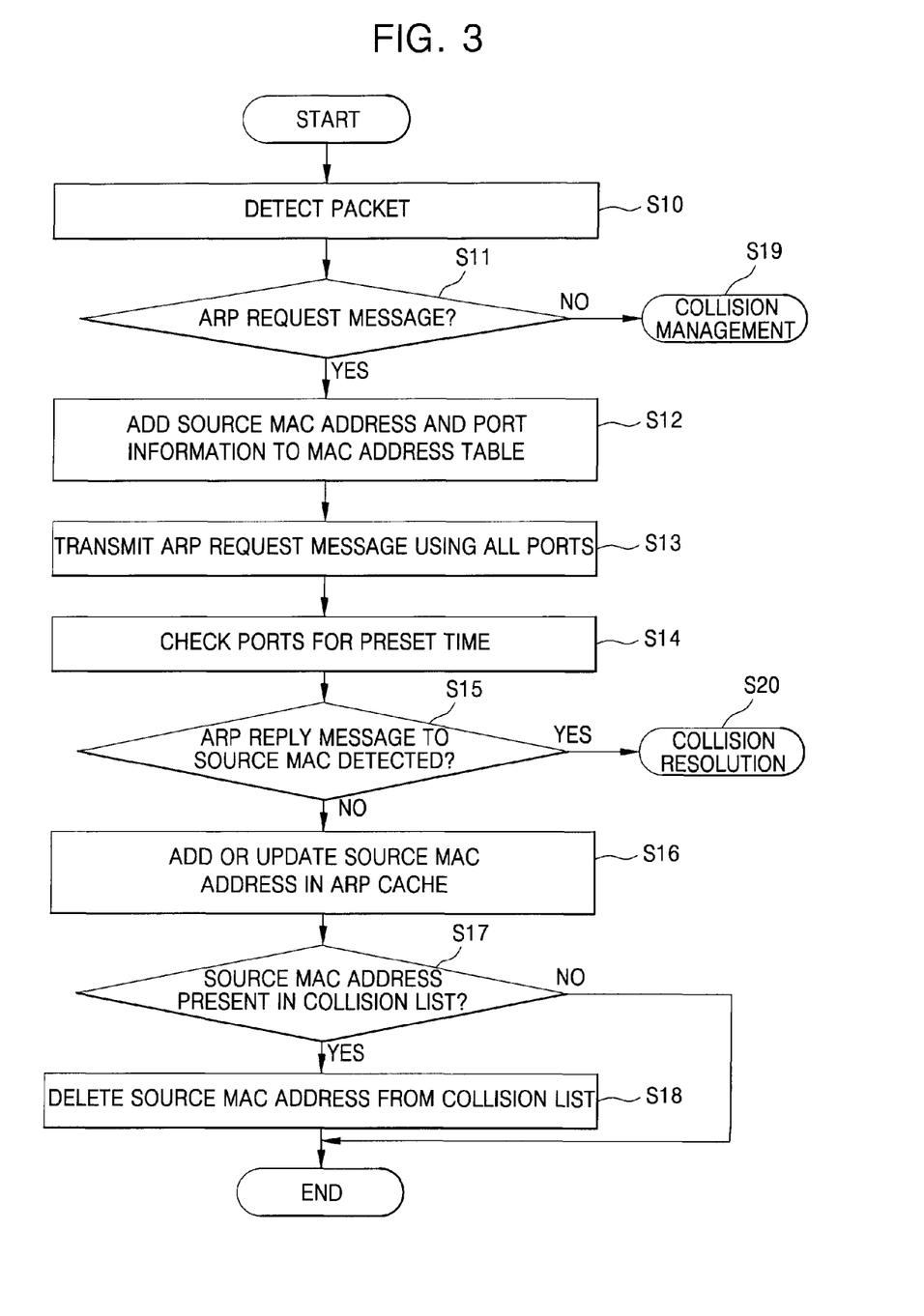
FIG. 3 is a flowchart illustrating a process of preventing network address collision according to an exemplary embodiment of the invention.

FIG. 3 is a flowchart illustrating a process of preventing network address collision in the network switch according to an exemplary embodiment of the invention.

As shown in FIG. 3, the network switch such as the L2 switch shown in FIG. 1 detects packets which are transmitted/received by packet transmitting/receiving ports in S10.

In S11, the network switch determines whether or not the packet type, detected by a port, is a Gratuitous ARP request message in use for the detection of an IP address collision.

Figure 5:
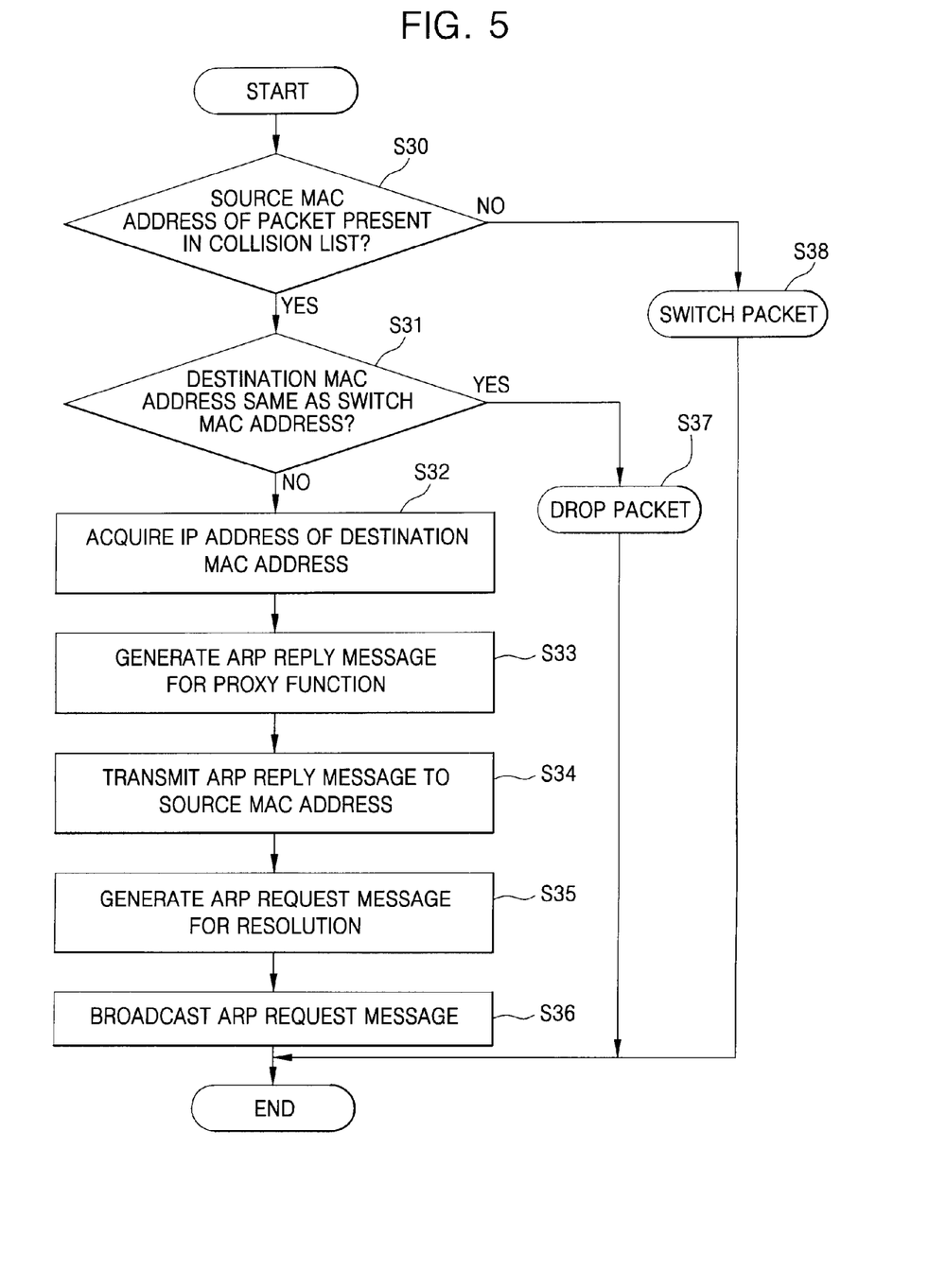
FIG. 5 is a flowchart illustrating a process of managing a network address collision according to an exemplary embodiment of the invention.

If the packet type, detected by a port, is not a Gratuitous ARP request message, the network switch performs a process of managing an IP address collision in S19. This process of managing an IP address collision will be described more fully with reference to a flowchart, as shown in FIG. 5, which illustrates a method of managing a network address collision according to an exemplary embodiment of the invention.

If the packet type, detected by a port, is a Gratuitous ARP request message, the network switch adds the MAC address and the port information of the IP node, which transmitted the Gratuitous ARP request message, to the MAC address table 24 via a MAC address learning process in S12.

Then, the network switch transmits a Gratuitous ARP request message by all ports to the network in S13, and determines all ports, which transmitted the Gratuitous ARP request message, for a preset time period in S14. Alternatively, the network switch may transmit the Gratuitous ARP request message to the network through fewer than all ports.

Figure 4:
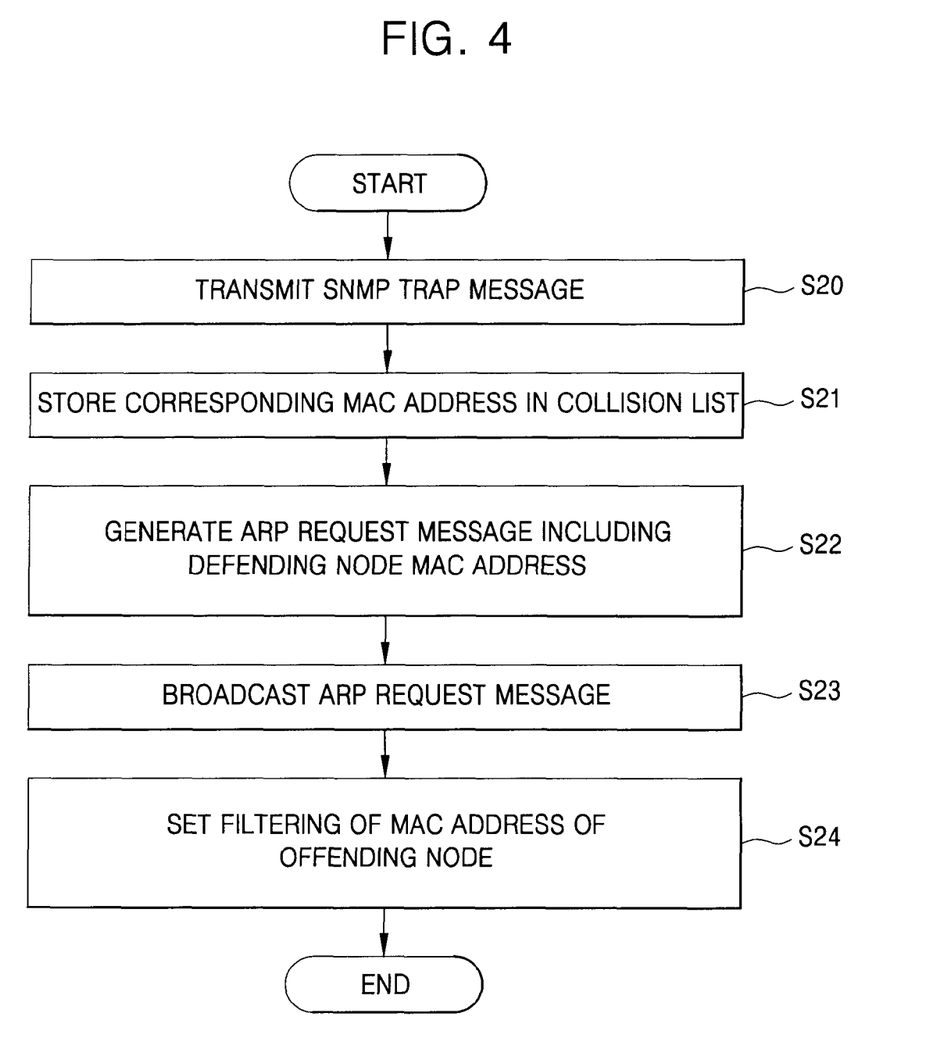
FIG. 4 is a flowchart illustrating a process of resolving a network address collision according to an exemplary embodiment of the invention.

The network switch determines whether or not a Gratuitous ARP reply message, transmitted to the MAC address included in the Gratuitous ARP request message, is received in S15. When a Gratuitous ARP reply message is received, the network switch determines that an IP address collision occurs and thus performs a process of resolving the IP address collision in S20. The process of resolving the IP address collision will be described more fully with reference to a flowchart, as shown in FIG. 4, which illustrates a process of resolving a network address collision according to an exemplary embodiment of the invention.

Conversely, when a Gratuitous ARP reply message, transmitted to the MAC address included in the Gratuitous ARP request message, is not received within a preset time period by all ports, the network switch adds or updates the MAC address, included in the Gratuitous ARP request message, to the ARP cache 25 in S16. Alternatively, the network switch may determine whether or not a Gratuitous ARP reply message is received by fewer than all the ports thereof within the preset time period.

Then, the network switch determines whether or not the MAC address, added or updated to the ARP cache 25, is included in the collision list 26 in order to determine whether or not the MAC address, added or updated to the ARP cache 25, is the MAC address of a node which was under the collision management, in S17. If the MAC address, added or updated to the ARP cache 24, is included in the collision list 26, the network switch ends the process.

If the MAC address, added or updated to the ARP cache 24, is included in the collision list 26, the network switch deletes the MAC address from the collision list 26 in S18. That is, the network switch deletes the MAC address from the collision list 26 because a node, which previously caused an IP address collision, is assigned with a new IP address, or there are no other nodes having the same active IP address.

FIG. 4 is a flowchart illustrating a process of resolving a network address collision according to an exemplary embodiment of the invention.

As shown in FIG. 4, when a Gratuitous ARP reply message, transmitted to the MAC address included in the Gratuitous ARP request message, is received within a preset time period in the step S15 of FIG. 3, the network switch transmits the collision information of the IP address in an SNMP trap message to the network in S20.

In S21, the network switch stores the MAC address of the offending node in the collision list.

Then, the network switch generates the Gratuitous ARP request message including the defending node address in S22. The network switch then broadcasts the MAC address of the defending node on the Gratuitous ARP request message to neighbor nodes in the same broadcast domain since the ARP cache of respective neighbor nodes in the same broadcast domain may be influenced by the offending node in S23.

Accordingly, the neighbor nodes, when receiving the Gratuitous ARP request message, can restore the ARP cache with the MAC address of the defending node.

When the Gratuitous ARP reply message is received from the defending node, the network switch drops the Gratuitous ARP reply message.

The network switch sets a MAC address filtering of the offending node in relation to the port, which received the Gratuitous ARP request message from the offending node in S24.

As a result, in the network switch, such as the L2 switch shown in FIG. 1, the packet is not transmitted via the port of the network switch, which received the Gratuitous ARP request message from the offending node, to other ports of the network switch.

Only the MAC address filtering is set since other switches may be connected in cascade to the port to which the offending node belongs, according to the network construction environment, or a plurality of nodes may be present through a switching hub in the offending node.

FIG. 5 is a flowchart illustrating a process of managing a network address collision of the network switch according to an exemplary embodiment of the invention.

As shown in FIG. 5, if the packet type, detected in S11 of FIG. 3, is not a Gratuitous ARP request message, the network switch determines whether or not the MAC address, included in the detected packet, is present in the collision list 26 in S30.

That is, the network switch determines whether or not the detected packet is transmitted from the offending node.

If the source MAC address in the detected packet is not included in the collision list 26, the network switch switches the packet normally in S38.

If the source MAC address in the detected packet is included in the collision list 26, the network switch determines whether or not the destination MAC address in the received packet is the same as its own MAC address in S31.

The network switch drops the detected packet if the destination MAC address is the same as its own MAC address in S37.

Here, the network switch drops the detected packet because the network switch is already performing a proxy function for a counterpart node, with which the offending node, having the MAC address included in the collision list 26, is trying to communicate.

In this case, the node, which transmitted the detected packet, is attempting to communicate with a node inside the broadcast domain, and thus the network switch performs a proxy function for the node inside the broadcast domain if the destination MAC address included in the detected packet is not the same as its own MAC address.

This process will be described more specifically.

The network switch acquires the IP address in relation to the destination MAC address, included in the detected packet, if the destination MAC address in the detected packet is not the same as its own MAC address in S32.

In particular, the network switch can acquire the IP address of the destination MAC address, included in the detected packet, using the ARP cache. As an alternative, the network switch can acquire the IP address of the destination MAC address by transmitting a specified ARP request message and then receiving an ARP reply message.

After the IP address of the destination MAC address included in the detected packet is acquired, the network switch generates an ARP reply message including its own MAC address for the proxy function in S33. The network switch then transmits the ARP reply message including its own MAC address to the offending node, which has the MAC address included in the detected packet in S34.

As mentioned above, the network switch performs a proxy function for the counterpart node, with which the node having the source MAC address, included in the detected packet, is trying to communicate. That is, the network switch receives packets, which the node having the origination MAC address, included in the detected packet, transmitted to the counterpart node, and drops the received packets.

Next, in order to update the ARP cache of respective nodes present in the broadcast domain, the network switch performs the following procedures.

That is, the network switch generates a Gratuitous ARP request message including the MAC address of the defending node in S35, and then broadcasts the Gratuitous ARP request message into the broadcast domain in S36.

As set forth above, according to the exemplary network switch and method of preventing an IP address collision, when a new node tries to use an IP address, which is being used in one broadcast domain, it is possible to detect and prevent an IP address collision in real-time, to disconnect only the new node which caused the IP address collision, and to quickly resolve network environments to the original state that existed prior to the collision, in order to prevent communication breakdown without the use of an additional device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A network switch comprising:
a collision detector for broadcasting a first Address Resolution Protocol (ARP) request message, received by a port of the network switch, to a broadcast domain, and if a first ARP reply message, transmitted to a source Media Access Control (MAC) address of the first ARP request message, is received, for storing the source MAC address in a collision list; and
a collision manager, which stores collision MAC addresses, for comparing a destination MAC address of a packet with a MAC address of the network switch if the packet is not the first ARP request message and the source MAC address is included in the collision list, for transmitting the first ARP reply message, including the MAC address of the network switch, to an originating node of the packet if the destination MAC address of the packet is not equal with the MAC address of the network switch, and for dropping the packet if the destination MAC address of the packet is equal with the MAC address of the network switch.

2. The network switch according to claim 1, wherein the collision detector, if the first ARP reply message is not received, determines whether or not the source MAC address, included in the first ARP request message, is present in the collision list, and deletes the source MAC address from the collision list.

3. The network switch according to claim 1, wherein the collision manager, if the destination MAC address of the packet is not equal to the MAC address of the network switch, acquires an Internet Protocol (IP) address corresponding to the destination MAC address of the packet, and transmits the first ARP reply message, including the MAC address of the network switch, to an offending node, which has the source MAC address of the packet.

4. The network switch according to claim 3, wherein the collision manager acquires the IP address corresponding to the destination MAC address by at least one of using an ARP cache.

5. The network switch according to claim 3, wherein the collision manager acquires the IP address corresponding to the destination MAC address by transmitting a specified ARP request message and then receiving a specified ARP reply message.

6. The network switch according to claim 3, wherein the offending node transmits a packet by setting the MAC address of the network switch, included in the ARP reply message, as a receiving MAC address.

7. The network switch according to claim 1, further comprising a collision resolver, which broadcasts a second ARP request message, for including a MAC address of a defending node, to the broadcast domain if the first ARP reply message is received in response to the first ARP request message.

8. The network switch according to claim 7, wherein the collision resolver drops the first ARP reply message received from the defending node.

9. The network switch according to claim 7, wherein the collision resolver generates a Simple Network Management Protocol (SNMP) trap message, including address collision information, and transmits the SNMP trap message to the broadcast domain.

10. The network switch according to claim 7, wherein the collision resolver sets a filtering of the port, which received the first ARP request message, in relation to the MAC address, included in the first ARP request message, to prevent the packet from being transmitted, via the port which received the first ARP request message, to other ports.

11. The network switch according to claim 1, further comprising:
a MAC address table for storing the MAC address and port information included in the first ARP request message; and
an ARP cache for storing MAC addresses and IP addresses,
wherein the collision list stores a MAC address of a first node for which the first ARP reply message in response to the first ARP request message is received.

12. A network switch comprising:
a collision detector for broadcasting a first ARP request message, received by a first port of the network switch, to a broadcast domain, and if a first ARP reply message in response to the first ARP request message is received, for storing a source MAC address of the first ARP request message in a collision list;
a collision manager for comparing a destination MAC address of a packet, received from a network, with a MAC address of the network switch if a source MAC address of the received packet is a collision MAC address, for transmitting the first ARP reply message, including the MAC address of the network switch, to an offending node if the destination MAC address of the received packet is not equal with the MAC address of the network switch, and for dropping the received packet if the destination MAC address of the received packet is equal with the MAC address of the network switch; and
a collision resolver for broadcasting a second ARP request message, including a MAC address of a defending node, to the broadcast domain if the first ARP reply message is received, to resolve the MAC address of the defending node by the neighbor node.

13. The network switch according to claim 12, wherein the collision resolver sets a filtering of the first port in relation to the MAC address of the offending node, to prevent a packet, received from the offending node, from being transmitted from the first port to other ports.

14. A method of preventing an address collision, comprising:
receiving a packet from a network;
upon a determination that the packet received from the network is a first ARP request message, transmitting the packet to a broadcast domain;
upon a determination that a first ARP reply message is received, storing a source MAC address of the packet in a collision list;
upon a determination that the packet received from the network is not the first ARP request message, determining whether the source MAC address of the packet is present in the collision list;
upon a determination that the source MAC address of the packet is present in the collision list, comparing a destination MAC address of the packet with a MAC address of a network switch;
upon a determination that the destination MAC address of the packet is not equal with the MAC address of the network switch, transmitting the first ARP reply message, including the MAC address of the network switch, to an offending node, to set the destination node of the packet as the MAC address of the network switch; and
upon a determination that the destination MAC address of the packet is equal with the MAC address of the network switch, dropping the packet.

15. The method according to claim 14, further comprising:
upon a determination that the first ARP reply message is not received, determining whether the source MAC address, included in the first ARP request message, is present in the collision list; and
upon a determination that the source MAC address, included in the first ARP request message, is present in the collision list, deleting the source MAC address from the collision list.

16. The method according to claim 14, comprising:
storing the source MAC address, included in the first ARP request message;
receiving port information in a MAC address table by MAC address learning;
upon a determination that the first ARP reply message is not received, storing the source MAC address in an ARP cache; and
upon a determination that the source MAC address is present in the collision list, deleting the source MAC address from the collision list.

17. The method according to claim 14, further comprising:
upon a determination that the source MAC address of the packet is not equal with the MAC address of the network switch, acquiring an IP address, corresponding to the destination MAC address of the packet, by using at least one of an ARP cache.

18. The method according to claim 14, further comprising:
upon a determination that the source MAC address of the packet is not equal with the MAC address of the network switch, acquiring an IP address, corresponding to the destination MAC address of the packet, by using a specified ARP reply message, which is received in response to a specified ARP request message transmitted to the network.

19. The method according to claim 14, further comprising:
upon a determination that the first ARP reply message is received, transmitting the first ARP request message, including a MAC address of a defending node, to the broadcast domain to resolve the MAC address of the defending node by a neighbor node; and dropping a second ARP reply message received form the defending node.

20. The method according to claim 14, further comprising:
upon a determination that the first reply message is received, setting a filtering of a port, which received the packet, in relation to the MAC address of the offending node.

21. A method of preventing an address collision, comprising:
receiving a packet from a network;
upon a determination that the packet received from a network is a first ARP request message:
transmitting the packet to a broadcast domain;
determining whether a first ARP reply message is received; and
upon a determination that the first ARP reply message is received,
storing a source MAC address of the first ARP request message in a collision list;
upon a determination that the packet received from the network is not the first ARP request message and a source MAC address of the packet is present in the collision list:
comparing a destination MAC address of the packet with a MAC address of a network switch;
upon a determination that the destination MAC address of the packet is not equal with the MAC address of the network switch, transmitting the first ARP reply message, including the MAC address of the network switch, to an offending node, which transmitted the packet; and
upon a determination that the destination MAC address of the packet is equal with the MAC address of the network switch, dropping the packet; and
upon a determination that the first ARP reply message is received:
broadcasting a second ARP request message, including a MAC address of a defending node, to the broadcast domain, to resolve the MAC address of the defending node by a neighbor node; and
setting a filtering of a port, which received the first ARP request message, in relation to a MAC address of the offending node.

22. The method according to claim 21, wherein the broadcasting of the second ARP request message, including a MAC address of a defending node, to the broadcast domain, comprises:
generating an SNMP trap message, including address collision information; and
transmitting the SNMP message to the broadcast domain.

* * * * *